(12) United States Patent
Gao et al.

(10) Patent No.: US 10,534,118 B2
(45) Date of Patent: Jan. 14, 2020

(54) DISPLAY DEVICE

(71) Applicant: BOE TECHNOLOGY GROUP CO., LTD., Beijing (CN)

(72) Inventors: Jian Gao, Beijing (CN); Yanbing Wu, Beijing (CN); Yingyi Li, Beijing (CN); Kairan Liu, Beijing (CN); Lin Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 24 days.

(21) Appl. No.: 15/511,493

(22) PCT Filed: Mar. 25, 2016

(86) PCT No.: PCT/CN2016/077339
§ 371 (c)(1),
(2) Date: Mar. 15, 2017

(87) PCT Pub. No.: WO2017/049889
PCT Pub. Date: Mar. 30, 2017

(65) Prior Publication Data
US 2017/0293057 A1 Oct. 12, 2017

(30) Foreign Application Priority Data
Sep. 23, 2015 (CN) .................... 2015 2 0743672 U

(51) Int. Cl.
*G02B 5/26* (2006.01)
*G02F 1/1335* (2006.01)
*G02F 1/13357* (2006.01)

(52) U.S. Cl.
CPC .......... *G02B 5/26* (2013.01); *G02F 1/133512* (2013.01); *G02F 1/133528* (2013.01); *G02F 1/133606* (2013.01)

(58) Field of Classification Search
CPC .......... G02B 135/26; G02B 5/26; G02B 5/20; G02B 5/265; G02F 1/133512;
(Continued)

(56) References Cited

U.S. PATENT DOCUMENTS 5,686,979 A * 11/1997 Weber ................. E06B 9/24
349/96
6,842,209 B2 * 1/2005 Sumiyoshi ........... G02F 1/1334
349/114
(Continued)

FOREIGN PATENT DOCUMENTS

| CN | 104406099 A | 3/2015 |
|---|---|---|
| CN | 104849904 A | 8/2015 |

(Continued)

OTHER PUBLICATIONS

Search Report and Written Opinion dated Jun. 28, 2016 from State Intellectual Property Office of the P.R. China.

*Primary Examiner* — Bao Q Truong
(74) *Attorney, Agent, or Firm* — Dilworth & Barrese, LLP.; Michael J. Musella, Esq.

(57) ABSTRACT

An embodiment of by the present disclosure provides a display device including a display panel, an anti-blue-light layer and a backlight module, the anti-blue-light layer is positioned between the display panel and the backlight module, and the anti-blue-light layer is capable of reflecting high-energy shortwave blue light incident from a direction of the backlight module and high-energy shortwave blue light incident from a direction of the display panel.

11 Claims, 3 Drawing Sheets

(58) Field of Classification Search
CPC ......... G02F 1/133528; G02F 1/133606; G02F 1/133621; G02F 2001/133624; F21V 9/00; F21V 9/20
USPC ........................................................ 362/97.2
See application file for complete search history.

(56) References Cited

U.S. PATENT DOCUMENTS

| | | | |
|---|---|---|---|
| 7,821,599 B2 * | 10/2010 | Mimura | G02F 1/133528 349/113 |
| 2004/0021809 A1 * | 2/2004 | Sumiyoshi | G02F 1/1334 349/113 |
| 2011/0116014 A1 * | 5/2011 | Lee | G02B 3/0056 349/64 |

FOREIGN PATENT DOCUMENTS

| | | |
|---|---|---|
| CN | 204964945 U | 1/2016 |
| KR | 101395498 B1 | 5/2014 |
| TW | M494919 U | 2/2015 |

* cited by examiner

DISPLAY DEVICE

TECHNICAL FIELD

Embodiments of the present disclosure belong to a technical field of display, relate to a display device, and in particular, to a display device capable of preventing high-energy shortwave blue light from damaging human eyes.

BACKGROUND

With increasing popularization of various display devices, people enter a brand-new "screen age". However, when bringing convenience to people, various electronic products which people use daily, e.g., a mobile phone, a television, a notebook computer and the like, also enable eyes of people to invisibly suffer from damage of a great quantity of high-energy shortwave blue light.

In recent years, more and more researches show that the high-energy shortwave blue light may cause damage to human eyes so as to cause retina damage, and even may cause macular degeneration of human eyes. The high-energy shortwave blue light (blue light for short hereinafter) means light of which a wavelength is between 410 nm and 470 nm, wherein the light with a wavelength between 435 nm and 440 nm damages human eyes the most seriously, and light with the wavelength on both sides of and near the above wavelength range has a progressively decreased damage to human eyes. Currently, people view various display devices for long time in daily life, and thus, influence of the blue light emitted by the display devices on human eyes is increased. If the blue light incident into human eyes from the display devices can be reduced by utilizing various methods, damage of the blue light to human eyes when people view the display devices for long time can be eliminated, and the occurrence probability of macular degeneration can be reduced.

In an existing technical solution, generally, the following two modes are adopted to reduce damage of the blue light to human eyes.

In a first mode, a user wears anti-blue-light glasses, so that damage of the blue light to human eyes can be reduced to a certain degree. However, the anti-blue-light glasses have the following defects that: a film structure is complex, and processing difficulty is high; the adsorbed blue light has a large wavelength range, so that a visual effect is influenced; not only the blue-purple light harmful for human eyes is shielded, but also blue-green light beneficial for human bodies is shielded; and when the user wears the anti-blue-light glasses, visual experience of human eyes may be influenced, and the anti-blue-light glasses can be only used for one person, so that a viewing feeling is poor;

In a second mode, an anti-blue-light layer is added in a display device. As shown in FIG. 1, an anti-blue-light layer 7 is arranged on a first polarizer 2 positioned above a display panel (i.e., a light emergent side of the display panel), wherein the display panel includes a color filter substrate 3, a liquid crystal layer 4 and an array substrate 5, a second polarizer 6 is arranged below the display panel (i.e., a light incident side of the display panel), a backlight module 1 is arranged below the second polarizer 6. Such a mode can reduce the blue light from the backlight module 1 to a great degree. However, blue light (e.g., blue light emitted by a Light-Emitting Diode (LED) illuminating lamp and the like) also presents in an external environment, and the anti-blue-light layer 7 has the optical reflection characteristic, can directly reflect the blue light from the external environment, but cannot absorb the blue light from the external environment; and thus, when a user uses such display device, the blue light reflected by the anti-blue-light layer 7 may enter human eyes to cause secondary damage to human eyes, and an original display image also can generate a color cast problem.

Thus it can be seen that in the prior art, no matter which mode is adopted, damage of the blue light to human eyes cannot be effectively reduced, so that various inconveniences exist in the using process of a consumer, such as, a reduction of a light transmittance of a product, an increase of maintenance cost or influence on use experience of the user. Particularly, when the second mode is adopted, due to the optical reflection characteristic of the anti-blue-light layer 7, human eyes are easy to suffer from secondary damage.

SUMMARY

Aiming at the problem that in an existing anti-blue-light display device, an anti-blue-light layer is adhered to an upper surface (i.e., a surface on a light emergent side) of a display panel so as to cause secondary damage of high-energy shortwave blue light to human eyes, the present disclosure provides a display device capable of avoiding damage of the high-energy shortwave blue light to human eyes.

One aspect of the present disclosure provides a display device, which includes a display panel, an anti-blue-light layer and a backlight module. The anti-blue-light layer is positioned between the display panel and the backlight module, and the anti-blue-light layer is capable of reflecting high-energy shortwave blue light incident from a direction of the backlight module and light incident from a direction of the display panel.

Optionally, the anti-blue-light layer reflects blue light with a wavelength between 435 nm and 440 nm.

Optionally, a micro lens array of a concave-convex structure is arranged on a surface of a side of the anti-blue-light layer facing to the display panel.

Optionally, a first polarizer is arranged on a side of the display panel away from the backlight module, and a second polarizer is arranged on a side of the display panel facing to the backlight module, wherein the anti-blue-light layer is positioned between the second polarizer and the backlight module.

Optionally, the anti-blue-light layer is adhered to a surface of a side of the second polarizer facing to the backlight module.

Optionally, the first polarizer is arranged on a side of the display panel away from the backlight module, and the second polarizer is arranged on a side of the display panel facing to the backlight module, wherein the anti-blue-light layer is positioned between the second polarizer and the display panel.

Optionally, the anti-blue-light layer is adhered to a surface of a side of the second polarizer facing to the display panel.

Optionally, a light diffusion layer is also arranged on a side of the second polarizer facing to the backlight module, and the anti-blue-light layer is positioned between the light diffusion layer and the backlight module.

Optionally, the anti-blue-light layer is adhered to a surface of a side of the light diffusion layer facing to the backlight module, or the light diffusion layer and the anti-blue-light layer form a composite layer.

Optionally, the anti-blue-light layer has a multilayer structure formed by at least two materials with different refractive indexes in an overlapping manner.

Optionally, a thickness of the anti-blue-light layer is 10~200 μm.

In the display device provided by the present disclosure, the anti-blue-light layer is positioned between the display panel and the backlight module, and thus, in one aspect, the high-energy shortwave blue light in light emitted by the backlight module can be reflected to the backlight module while light with other wavelengths penetrates the anti-blue-light layer, so that strength of the high-energy shortwave blue light emitted by the backlight module is reduced while a display effect is not influenced; in another aspect, as for such novel display device, after external environment light enters the display panel, high-energy shortwave blue light in the external environment light is effectively attenuated by adsorption of the multilayer structure (an array substrate, a liquid crystal layer, a color filter substrate and the like) in the display panel, the attenuated high-energy shortwave blue light is incident to the surface of the anti-blue-light layer and is reflected by the anti-blue-light layer, and the reflected high-energy shortwave blue light reenters the display panel and is absorbed by the multilayer structure in the display panel, so that no or little high-energy shortwave blue light presents in the light (not only including the reflected external environment light, but also including the light emitted by the backlight module) emitted from the display panel. Therefore, compared with the display device with the anti-blue-light layer arranged on a side of the display panel away from the backlight module in the prior art, the display device provided by the embodiments can eliminate secondary damage of the high-energy shortwave blue light in the external environment light, which is reflected by the anti-blue-light layer, to human eyes.

DETAILED DESCRIPTION

In order to make those skilled in the art understand the technical solution of the present disclosure better, the present disclosure will be further described in details in connection with the drawings and the specific embodiments.

Embodiment 1:

The embodiment provides a display device, which includes a display panel, an anti-blue-light layer and a backlight module. The anti-blue-light layer is positioned between the display panel and the backlight module, and the anti-blue-light layer not only is capable of reflecting high-energy shortwave blue light incident from a direction of the backlight module (which is from the backlight module), but also is capable of reflecting high-energy shortwave blue light incident from a direction of the display panel (which is from an external environment). The anti-blue-light layer is capable of reflecting light of which a wavelength is between 410 nm and 470 nm. Further, the anti-blue-light layer can mainly reflect light of which a wavelength is between 435 nm and 440 nm, which is beneficial for guaranteeing a color effect of a displayed image.

According to the display device provided by the embodiment, the anti-blue-light layer is arranged between the display panel and the backlight module, and thus, in one aspect, the high-energy shortwave blue light in light emitted by the backlight module can be reflected to the backlight module while light with other wavelengths penetrates the anti-blue-light layer, so that strength of the high-energy shortwave blue light emitted by the backlight module is reduced; and in the other aspect, for such novel display device, after external environment light enters the display panel, high-energy shortwave blue light in the external environment light is effectively attenuated by adsorption of a multilayer structure (an array substrate, a liquid crystal layer, a color filter substrate and the like) in the display panel, the attenuated high-energy shortwave blue light is incident to the surface of the anti-blue-light layer and is reflected by the anti-blue-light layer, and the reflected high-energy shortwave blue light reenters the display panel and is absorbed by the multilayer structure in the display panel, so that no or little high-energy shortwave blue light presents in the light emitted from the display panel(not only including the reflected external environment light, but also including the light emitted by the backlight module). Therefore, compared with a display device with an anti-blue-light layer arranged on a side of a display panel away from a backlight module in the prior art, the display device provided by the embodiment can eliminate secondary damage to human eyes, due to the high-energy shortwave blue light in the external environment light reflected by the anti-blue-light layer.

The specific structures of the display device of the present disclosure will be described in details by Embodiments 2 to 9.

Figure 1:
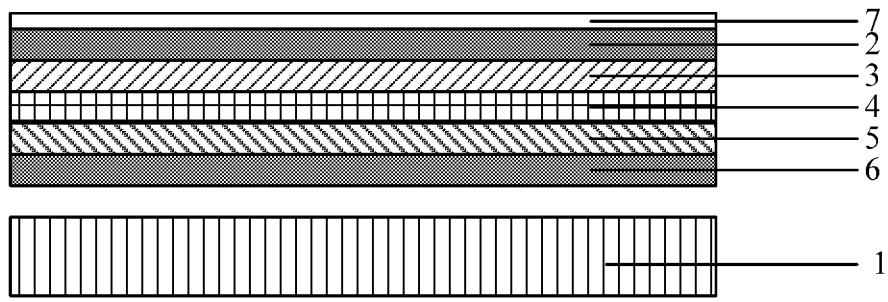
FIG. 1 is a structural schematic diagram of an existing display device.
Figure 2:
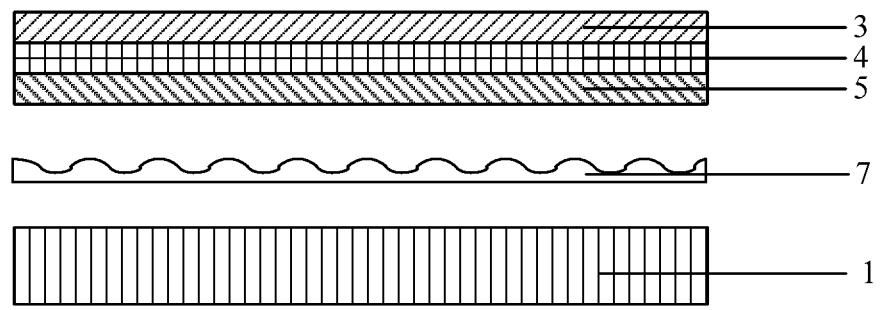
FIG. 2 is a structural schematic diagram of a display device provided by Embodiment 2 of the present disclosure.

Embodiment 2:

As shown in FIG. 2, the embodiment provides a display device, which includes a display panel, an anti-blue-light layer 7 and a backlight module 1. The anti-blue-light layer 7 is positioned between a light incident side of the display panel and a light emergent side of the backlight module 1, and the anti-blue-light layer 7 is capable of reflecting high-energy shortwave blue light incident from a direction of the backlight module 1 and high-energy shortwave blue light incident from a direction of the display panel.

Wherein, the display panel includes: a color filter substrate 3, a liquid crystal layer 4 and an array substrate 5. The array substrate 5 is positioned on the light incident side of the display panel, i.e., a side facing to the backlight module 1, and the anti-blue-light layer 7 is positioned between the array substrate 5 of the display panel and the backlight module 1. Generally, polarizers may be arranged on both sides of the display panel.

The anti-blue-light layer 7 is capable of reflecting light of which a wavelength is between 410~470 nm. Further, the anti-blue-light layer can mainly reflect light of which a wavelength is between 435~440 nm, which is beneficial for guaranteeing a color effect of a displayed image.

Optionally, a micro lens array of a concave-convex structure is arranged on a surface of a side of the anti-blue-light layer 7 facing to the display panel.

In the embodiment, the micro lens array of the concave-convex structure is arranged on a surface of the side of the anti-blue-light layer 7 facing to the display panel, so that a Newton ring phenomenon generated at a display end due to adsorption of the anti-blue-light layer and the polarizer on the light incident side of the display panel can be prevented, and meanwhile, the dispersion of the anti-blue-light layer 7 on light with other wavelengths also can be weakened and a display effect can be improved.

Optionally, the anti-blue-light layer 7 includes a multilayer structure formed by at least two materials with different refractive indexes in an overlapping manner.

Optionally, a thickness of the anti-blue-light layer 7 is 10~200 μm. Certainly, as long as the anti-blue-light layer 7 can effectively reflect the high-energy shortwave blue light, the thickness of the anti-blue-light layer 7 is not limited thereto, which is not repeated herein.

In the embodiment, the anti-blue-light layer 7 is formed by at least two materials with different refractive indexes in an overlapping manner, the anti-blue-light layers 7 with different structures and different thicknesses can be suitable for different specifications of backlight modules.

According to the display device provided by the embodiment, the anti-blue-light layer 7 is arranged between the light incident side of the display panel and the light emergent side of the backlight module 1, and thus, in one aspect, the high-energy shortwave blue light in light emitted by the backlight module 1 can be reflected to the backlight module 1 while light with other wavelengths penetrates the anti-blue-light layer, so that strength of the high-energy shortwave blue light emitted by the backlight module 1 is reduced; and in the other aspect, for such novel display device, after external environment light enters the display panel, high-energy shortwave blue light in the external environment light is effectively attenuated by adsorption of the multilayer structure (the array substrate 5, the liquid crystal layer 4, the color filter substrate 3 and the like) in the display panel, the attenuated high-energy shortwave blue light is incident to the surface of the anti-blue-light layer 7 and is reflected by the anti-blue-light layer 7, and the reflected high-energy shortwave blue light reenters the display panel and is absorbed by the multilayer structure in the display panel, so that no or little high-energy shortwave blue light presents in the light emitted from the display panel (not only including the reflected external environment light, but also including the light emitted by the backlight module). Therefore, compared with the display device with the anti-blue-light layer arranged on the side of the display panel away from the backlight module in the prior art, the display device provided by the embodiment can eliminate secondary damage to human eyes, due to the high-energy shortwave blue light in the external environment light reflected by the anti-blue-light layer 7.

Embodiment 3

Figure 3:
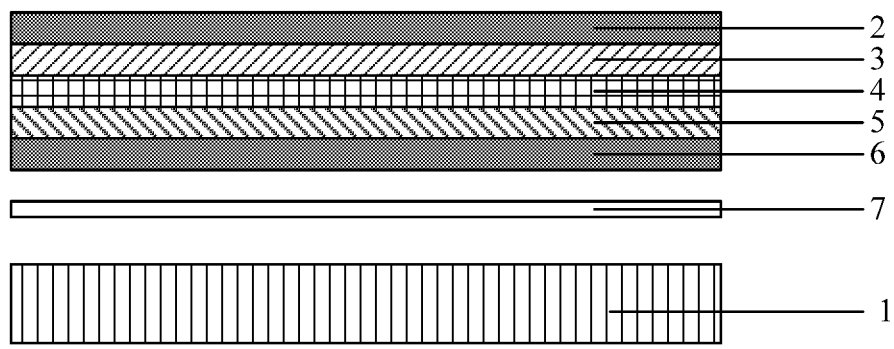
FIG. 3 is a structural schematic diagram of a display device provided by Embodiment 3 of the present disclosure.

As shown in FIG. 3, the embodiment provides a display device, which includes a display panel, an anti-blue-light layer 7 and a backlight module 1. The anti-blue-light layer 7 is positioned between a light incident side of the display panel and a light emergent side of the backlight module 1, and the anti-blue-light layer 7 is capable of reflecting high-energy shortwave blue light incident from a direction of the backlight module 1 and high-energy shortwave blue light incident from a direction of the display panel.

Wherein, the display panel includes: a color filter substrate 3, a liquid crystal layer 4 and an array substrate 5, and the array substrate 5 is positioned on the light incident side, i.e., a side facing to the backlight module 1, of the display panel.

Optionally, the anti-blue-light layer is capable of reflecting light of which a wavelength is between 410~470 nm. Further, the anti-blue-light layer can mainly reflect light of which a wavelength is between 435~440 nm, which is beneficial for guaranteeing a color effect of a displayed image.

Optionally, a first polarizer 2 is arranged on a side of the display panel away from the backlight module 1(i.e., a light emergent side), a second polarizer 6 is arranged on a side of the display panel facing to the backlight module 1 (i.e., the light incident side), and the anti-blue-light layer 7 is positioned between the second polarizer 6 and the backlight module 1. In other words, the first polarizer 2 is arranged above the color filter substrate 3, and the second polarizer 6 is arranged below the array substrate 5.

Optionally, the anti-blue-light layer 7 includes a multilayer structure formed by at least two materials with different refractive indexes in an overlapping manner.

Optionally, a thickness of the anti-blue-light layer 7 is 10~200 μm. Certainly, as long as the anti-blue-light layer 7 can effectively reflect the high-energy shortwave blue light, the thickness of the anti-blue-light layer 7 is not limited thereto, which is not repeated herein.

In the embodiment, the anti-blue-light layer 7 is formed by at least two materials with different refractive indexes in an overlapping manner, the anti-blue-light layers 7 with different structures and different thicknesses can be suitable for different specifications of backlight modules.

According to the display device provided by the embodiment, the anti-blue-light layer 7 is arranged between the light incident side of the display panel and the light emergent side of the backlight module 1, and thus, in one aspect, the high-energy shortwave blue light in light emitted by the backlight module 1 can be reflected to the backlight module 1 while light with other wavelengths penetrates the anti-blue-light layer, so that strength of the high-energy shortwave blue light emitted by the backlight module 1 is reduced; and in the other aspect, for such novel display device, after external environment light enters the display panel, high-energy shortwave blue light in the external environment light is effectively attenuated by adsorption of the multilayer structure (the array substrate 5, the liquid crystal layer 4, the color filter substrate 3 and the like) in the display panel, the attenuated high-energy shortwave blue light is incident to the surface of the anti-blue-light layer 7 and is reflected by the anti-blue-light layer 7, and the reflected high-energy shortwave blue light reenters the display panel and is absorbed by the multilayer structure in the display panel, so that no or little high-energy shortwave blue light presents in the light emitted from the display panel (not only including the reflected external environment light, but also including the light emitted by the backlight module). Therefore, compared with the display device with the anti-blue-light layer arranged on the side of the display panel away from the backlight module in the prior art, the display device provided by the embodiment can eliminate secondary damage to human eyes, due to the high-energy shortwave blue light in the external environment light, which is reflected by the anti-blue-light layer 7.

Obviously, various changes also can be made to the display device of the embodiment. For example, a micro lens array of a concave-convex structure can be arranged on a surface of a side of the anti-blue-light layer 7 facing to the display panel.

Figure 4:
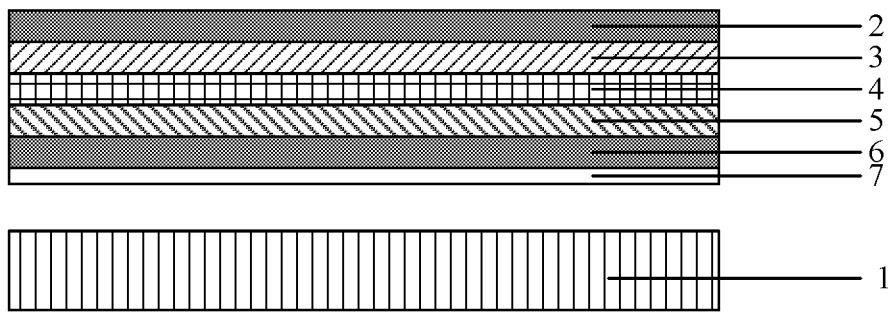
FIG. 4 is a structural schematic diagram of a display device provided by Embodiment 4 of the present disclosure.

Embodiment 4:

As shown in FIG. 4, the embodiment provides a display device, which has a similar structure with the display device provided by Embodiment 3. The difference between the display device provided by Embodiment 4 and the display device provided by Embodiment 3 is only that the anti-blue-light layer 7 is directly adhered to the lower surface (i.e., the surface on a side facing to a backlight module) of a second polarizer 6, and is integratedly formed with the second polarizer 6 and a display panel, so that process steps are reduced, and use flexibility of the anti-blue-light layer 7 is improved.

According to the display device provided by the embodiment, the anti-blue-light layer 7 is arranged between a light incident side of the second polarizer 6 and a light emergent side of the backlight module 1, and thus, in one aspect, high-energy shortwave blue light in light emitted by the backlight module 1 can be reflected to the backlight module 1 while light with other wavelengths penetrates the anti-blue-light layer, so that strength of the high-energy shortwave blue light emitted by the backlight module 1 is reduced; and in the other aspect, for such novel display device, after external environment light enters the display panel, high-energy shortwave blue light in the external environment light is effectively attenuated by adsorption of a multilayer structure (an array substrate 5, a liquid crystal layer 4, a color filter substrate 3 and the like) in the display panel, the attenuated high-energy shortwave blue light is incident to the surface of the anti-blue-light layer 7 and is reflected by the anti-blue-light layer 7, and the reflected high-energy shortwave blue light reenters the display panel and is absorbed by the multilayer structure in the display panel, so that no or little high-energy shortwave blue light presents in the light emitted from the display panel (not only including the reflected external environment light, but also including the light emitted by the backlight module). Therefore, compared with the display device with the anti-blue-light layer arranged on the side of the display panel away from the backlight module in the prior art, the display device provided by the embodiment can eliminate secondary damage to human eyes, due to the high-energy shortwave blue light in the external environment light reflected by the anti-blue-light layer 7; and meanwhile, the anti-blue-light layer 7 is directly adhered to the lower surface of the second polarizer 6, and is integratedly formed with the second polarizer 6 and the display panel, so that the process steps are reduced, and use flexibility of the anti-blue-light layer 7 is improved.

Obviously, various changes also can be made to the display device of the embodiment. For example, a micro lens array of a concave-convex structure can be arranged on a surface of a side of the anti-blue-light layer 7 facing to the display panel.

Figure 5:
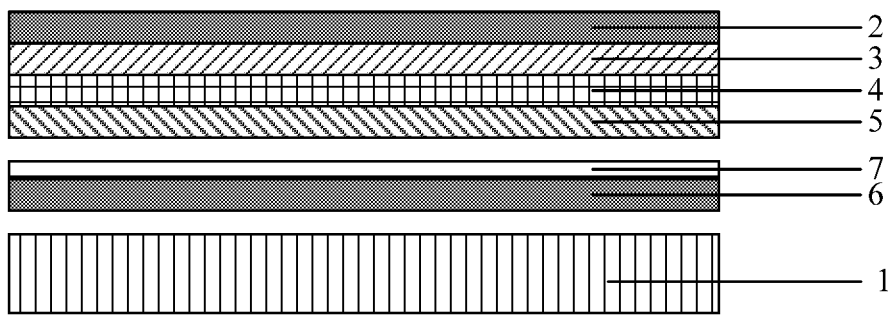
FIG. 5 is a structural schematic diagram of a display device provided by Embodiment 5 of the present disclosure.

Embodiment 5:

As shown in FIG. 5, the embodiment provides a display device, which includes a display panel, an anti-blue-light layer 7 and a backlight module 1. The anti-blue-light layer 7 is positioned between a light incident side of the display panel and a light emergent side of the backlight module 1, and the anti-blue-light layer 7 is capable of reflecting high-energy shortwave blue light incident from a direction of the backlight module 1 and high-energy shortwave blue light incident from a direction of the display panel.

Wherein, the display panel includes: a color filter substrate 3, a liquid crystal layer 4 and an array substrate 5, and the array substrate 5 is positioned on the light incident side, i.e., a side facing to the backlight module 1, of the display panel.

Optionally, the anti-blue-light layer is capable of reflecting light of which a wavelength is between 410~470 nm. Further, the anti-blue-light layer can mainly reflect light of which a wavelength is between 435~440 nm, which is beneficial for guaranteeing a color effect of a displayed image.

Optionally, a first polarizer 2 is arranged on a side (i.e., a light emergent side) of the display panel away from the backlight module 1, the anti-blue-light layer 7 is positioned on a light incident side (i.e., a side facing to the backlight module 1) of the array substrate 5 of the display panel, and a second polarizer 6 is arranged on a side of the anti-blue-light layer 7 facing to the backlight module 1, i.e., the anti-blue-light layer 7 is positioned between the second polarizer 6 and the display panel. In other words, the first polarizer 2 is arranged above the color filter substrate 3, and the second polarizer 6 is arranged below the anti-blue-light layer 7.

Optionally, the anti-blue-light layer 7 includes a multi-layer structure formed by at least two materials with different refractive indexes in an overlapping manner.

Optionally, a thickness of the anti-blue-light layer 7 is 10~200 μm. Certainly, as long as the anti-blue-light layer 7 can effectively reflect the high-energy shortwave blue light, the thickness of the anti-blue-light layer 7 is not limited thereto, which is not repeated herein.

In the embodiment, the anti-blue-light layer 7 is formed by at least two materials with different refractive indexes in an overlapping manner, and the anti-blue-light layers 7 with different structures and different thicknesses can be suitable for different specifications of backlight modules.

According to the display device provided by the embodiment, the anti-blue-light layer 7 is arranged between a light emergent side of the second polarizer 6 and the light incident side of the display panel; and thus, in one aspect, the high-energy shortwave blue light in light emitted by the backlight module 1 can be reflected to the backlight module 1 while light with other wavelengths penetrates the anti-blue-light layer, so that strength of the high-energy shortwave blue light emitted by the backlight module 1 is reduced; in the other aspect, for such novel display device, after external environment light enters the display panel, high-energy shortwave blue light in the external environment light is effectively attenuated by adsorption of the multilayer structure (the array substrate 5, the liquid crystal layer 4, the color filter substrate 3 and the like) in the display panel, the attenuated high-energy shortwave blue light is incident to a surface of the anti-blue-light layer 7 and is reflected by the anti-blue-light layer 7, and the reflected high-energy shortwave blue light reenters the display panel and is absorbed by the multilayer structure in the display panel, so that no or little high-energy shortwave blue light presents in the light emitted from the display panel (not only including the reflected external environment light, but also including the light emitted by the backlight module). Therefore, compared with the display device with the anti-blue-light layer arranged on the side of the display panel away from the backlight module in the prior art, the display device provided by the embodiment can completely eliminate secondary damage to human eyes, due to the high-energy shortwave blue light in the external environment light reflected by the anti-blue-light layer 7.

Obviously, various changes also can be made to the display device of the embodiment. For example, a micro lens array of a concave-convex structure can be arranged on the surface of a side of the anti-blue-light layer 7 facing to the display panel.

Figure 6:
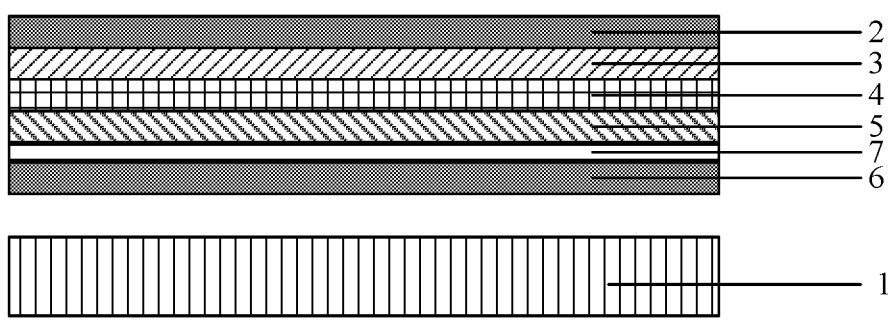
FIG. 6 is a structural schematic diagram of a display device provided by Embodiment 6 of the present disclosure.

Embodiment 6:

As shown in FIG. 6, the embodiment provides a display device, which has a similar structure with the display device provided by Embodiment 3. The difference between the display device provided by Embodiment 6 and the display device provided by Embodiment 3 is only that an anti-blue-light layer 7 is directly adhered to the upper surface (i.e., the surface on a side far away from a backlight module) of a second polarizer 6, and is integratedly formed with the second polarizer 6 and a display panel, so that process steps are reduced, and use flexibility of the anti-blue-light layer 7 is improved.

According to the display device provided by the embodiment, the anti-blue-light layer 7 is arranged between the surface of a light emergent side (i.e., a side facing to the display panel) of the second polarizer 6 and a light incident side of the display panel; and thus, in one aspect, high-energy shortwave blue light in light emitted by the backlight module 1 can be reflected to the backlight module 1 while light with other wavelengths penetrates the anti-blue-light layer, so that strength of the high-energy shortwave blue light emitted by the backlight module 1 is reduced; and in the other aspect, for such novel display device, after external environment light enters the display panel, high-energy shortwave blue light in the external environment light is effectively attenuated by adsorption of a multilayer structure (an array substrate 5, a liquid crystal layer 4, a color filter substrate 3 and the like) in the display panel, the attenuated high-energy shortwave blue light is incident to the surface of the anti-blue-light layer 7 and is reflected by the anti-blue-light layer 7, and the reflected high-energy shortwave blue light reenters the display panel and is absorbed by the multilayer structure in the display panel, so that no or little high-energy shortwave blue light presents in the light emitted from the display panel (not only including the reflected external environment light, but also including the light emitted by the backlight module). Therefore, compared with the display device with the anti-blue-light layer arranged on the side of the display panel away from the backlight module in the prior art, the display device provided by the embodiment can eliminate secondary damage7 to human eyes, due to the high-energy shortwave blue light in the external environment light reflected by the anti-blue-light layer; and meanwhile, the anti-blue-light layer 7 is directly adhered to the upper surface of the second polarizer 6, and is integratedly formed with the second polarizer 6 and the display panel, so that the process steps are reduced, and use flexibility of the anti-blue-light layer 7 is improved.

Obviously, various changes also can be made to the display device of the embodiment. For example, a micro lens array of a concave-convex structure can be arranged on a surface of a side of the anti-blue-light layer 7 facing to the display panel.

Figure 7:
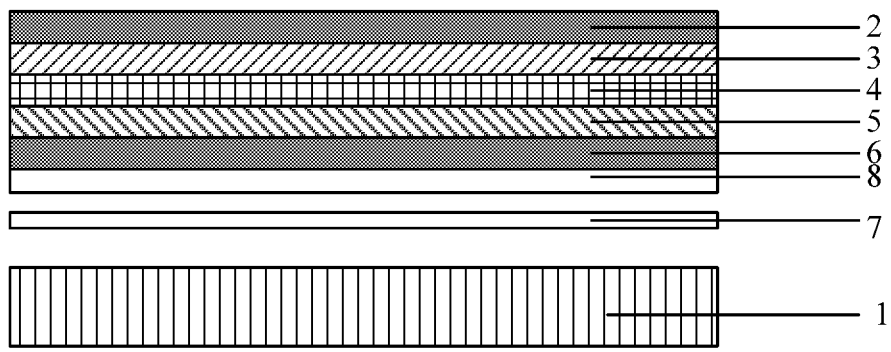
FIG. 7 is a structural schematic diagram of a display device provided by Embodiment 7 of the present disclosure.

Embodiment 7:

As shown in FIG. 7, the embodiment provides a display device, which includes a display panel, an anti-blue-light layer 7 and a backlight module 1. The anti-blue-light layer 7 is positioned between a light incident side of the display panel and a light emergent side of the backlight module 1, and the anti-blue-light layer 7 is capable of reflecting high-energy shortwave blue light incident from a direction of the backlight module and high-energy shortwave blue light incident from a direction of the display panel.

Wherein, the display panel includes: a color filter substrate 3, a liquid crystal layer 4 and an array substrate 5, and the array substrate 5 is positioned on the light incident side, i.e., a side facing to the backlight module 1, of the display panel.

Optionally, the anti-blue-light layer is capable of reflecting light of which a wavelength is between 410~470 nm. Further, the anti-blue-light layer can mainly reflect light of which a wavelength is between 435~440 nm, which is beneficial for guaranteeing a color effect of a displayed image.

Optionally, a first polarizer 2 is arranged on a side (i.e., a light emergent side) of the display panel away from the backlight module 1, a second polarizer 6 is arranged on a side (i.e., the light incident side) of the display panel facing to the backlight module 1, a light diffusion layer 8 is also arranged on a side of the second polarizer facing to the backlight module 1, and the anti-blue-light layer 7 is positioned between the light diffusion layer 8 and the backlight module 1.

Optionally, the anti-blue-light layer 7 includes a multi-layer structure formed by at least two materials with different refractive indexes in an overlapping manner. Optionally, a thickness of the anti-blue-light layer 7 is 10~200 μm. Certainly, as long as the anti-blue-light layer 7 can effectively reflect the high-energy shortwave blue light, the thickness of the anti-blue-light layer 7 is not limited thereto, which is not repeated herein.

In the embodiment, the anti-blue-light layer 7 is formed by at least two materials with different refractive indexes in an overlapping manner, and the anti-blue-light layers 7 with different structures and different thicknesses can be suitable for different specifications of backlight modules.

According to the display device provided by the embodiment, the anti-blue-light layer 7 is arranged between a light incident side of the light diffusion layer 8 and the light emergent side of the backlight module 1; and thus, in one aspect, the high-energy shortwave blue light in light emitted by the backlight module 1 can be reflected to the backlight module 1 while light with other wavelengths penetrates the anti-blue-light layer, so that strength of the high-energy shortwave blue light emitted by the backlight module 1 is reduced; in the other aspect, for such novel display device, after external environment light enters the display panel, high-energy shortwave blue light in the external environment light is effectively attenuated by adsorption of the multilayer structure (the array substrate 5, the liquid crystal layer 4, the color filter substrate 3 and the like) in the display panel, the attenuated high-energy shortwave blue light is incident to the surface of the anti-blue-light layer 7 and is reflected by the anti-blue-light layer 7, and the reflected high-energy shortwave blue light reenters the display panel and is absorbed by the multilayer structure in the display panel, so that no or little high-energy shortwave blue light presents in the light emitted from the display panel (not only including the reflected external environment light, but also including the light emitted by the backlight module). Therefore, compared with the display device with the anti-blue-light layer arranged on the side of the display panel away from the backlight module in the prior art, the display device provided by the embodiment can completely eliminate secondary damage to human eyes, due to the high-energy shortwave blue light in the external environment light reflected by the anti-blue-light layer 7.

Obviously, various changes also can be made to the display device of the embodiment. For example, a micro lens array of a concave-convex structure can be arranged on a surface of a side of the anti-blue-light layer 7 facing to the display panel.

Figure 8:
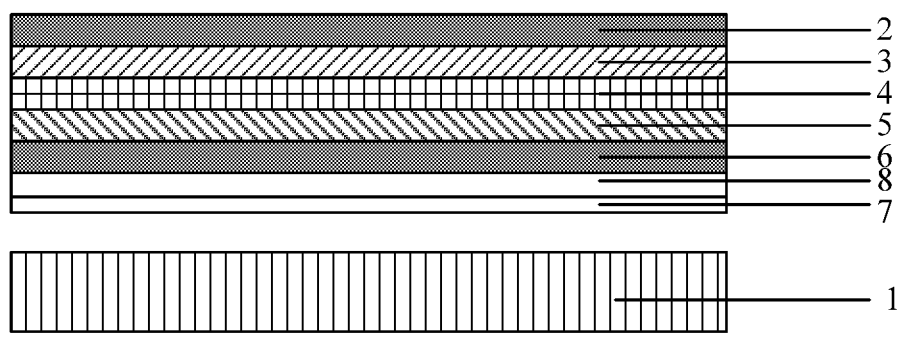
FIG. 8 is a structural schematic diagram of a display device provided by Embodiment 8 of the present disclosure.

Embodiment 8:

As shown in FIG. 8, the embodiment provides a display device, which has a similar structure with the display device provided by Embodiment 7. The difference between the display device provided by Embodiment 8 and the display device provided by the embodiment 7 is only that an anti-blue-light layer 7 is directly adhered to the lower surface (i.e., the surface on a side facing to a backlight module) of a light diffusion layer 8, and is integratedly formed with the light diffusion layer 8 and a display panel, so that process steps are reduced, and use flexibility of the anti-blue-light layer 7 is improved.

According to the display device provided by the embodiment, the anti-blue-light layer 7 is arranged between a light incident side of the light diffusion layer 8 and a light emergent side of the backlight module 1; and thus, in one aspect, high-energy shortwave blue light in light emitted by the backlight module 1 can be reflected to the backlight module 1 while light with other wavelengths penetrates the anti-blue-light layer, so that strength of the high-energy shortwave blue light emitted by the backlight module 1 is reduced; in the other aspect, for such novel display device, after external environment light enters the display panel, high-energy shortwave blue light in the external environment light is effectively attenuated by adsorption of a multilayer structure (an array substrate 5, a liquid crystal layer 4, a color filter substrate 3 and the like) in the display panel, the attenuated high-energy shortwave blue light is incident to the surface of the anti-blue-light layer 7 and is reflected by the anti-blue-light layer 7, and the reflected high-energy shortwave blue light reenters the display panel and is absorbed by the multilayer structure in the display panel, so that no or little high-energy shortwave blue light presents in the light emitted from the display panel (not only including the reflected external environment light, but also including the light emitted by the backlight module). Therefore, compared with the display device with the anti-blue-light layer arranged on the side of the display panel away from the backlight module in the prior art, the display device provided by the embodiment can completely eliminate secondary damage to human eyes, due to the high-energy shortwave blue light in the external environment light reflected by the anti-blue-light layer 7; and meanwhile, the anti-blue-light layer 7 is directly adhered to the lower surface of the light diffusion layer 8, and is integratedly formed with the light diffusion layer 8 and the display panel, so that the process steps are reduced, and use flexibility of the anti-blue-light layer 7 is improved.

Obviously, various changes also can be made to the display device of the embodiment. For example, a micro lens array of a concave-convex structure can be arranged on a surface of a side of the anti-blue-light layer 7 facing to the display panel.

Figure 9:
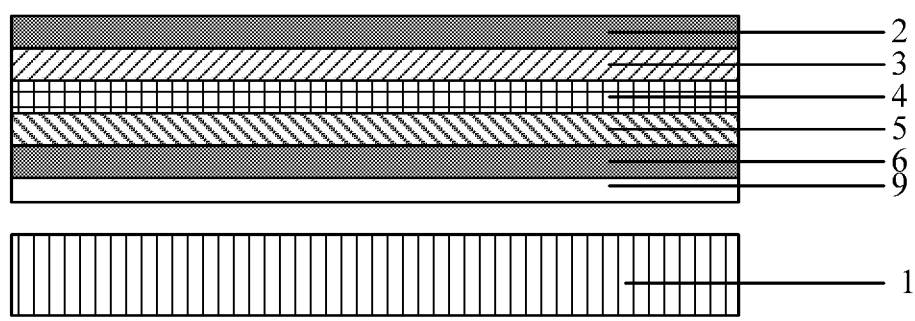
FIG. 9 is a structural schematic diagram of a display device provided by Embodiment 9 of the present disclosure.

Embodiment 9:

As shown in FIG. 9, the embodiment provides a display device, which has a similar structure with the display device provided by Embodiment 8. The difference between the display device provided by Embodiment 9 and the display device provided by Embodiment 8 is only that a light diffusion layer 8 and an anti-blue-light layer 7 form a composite layer 9. In other words, the light diffusion layer 8 and the anti-blue-light layer 7 are compounded together to form the composite layer 9 so as to reduce an integral thickness of the display device.

According to the display device provided by the embodiment, the composite layer 9 is arranged between a light incident side of a second polarizer 6 and a light emergent side of a backlight module 1; and thus, in one aspect, high-energy shortwave blue light in light emitted by the backlight module 1 can be reflected to the backlight module 1 while light with other wavelengths penetrates the anti-blue-light layer, so that strength of the high-energy shortwave blue light emitted by the backlight module 1 is reduced; in the other aspect, for such novel display device, after external environment light enters a display panel, high-energy shortwave blue light in the external environment light is effectively attenuated by adsorption of a multilayer structure (an array substrate 5, a liquid crystal layer 4, a color filter substrate 3 and the like) in the display panel, the attenuated high-energy shortwave blue light is incident to the surface of the anti-blue-light layer 7 and is reflected by the anti-blue-light layer 7, and the reflected high-energy shortwave blue light reenters the display panel and is absorbed by the multilayer structure in the display panel, so that no or little high-energy shortwave blue light presents in the light emitted from the display panel (not only including the reflected external environment light, but also including the light emitted by the backlight module). Therefore, compared with the display device with the anti-blue-light layer arranged on the side of the display panel away from the backlight module in the prior art, the display device provided by the embodiment can completely eliminate secondary damage to human eyes, due to the high-energy shortwave blue light in the external environment light reflected by the anti-blue-light layer 7; and meanwhile, the light diffusion layer 8 and the anti-blue-light layer 7 form the composite layer 9 so as to reduce the integral thickness of the display device.

Obviously, various changes also can be made to the display device of the embodiment. For example, a micro lens array of a concave-convex structure can be arranged on a surface of a side of the anti-blue-light layer 7 facing to the display panel.

It can be understood that the foregoing embodiments merely are exemplary embodiments adopted for illustrating the principle of the present disclosure, but the present disclosure is not limited thereto. Those skilled in the art can make various modifications and improvements without departure from the spirit and essence of the present disclosure, and these modifications and improvements also shall fall within the scope of protection of the present disclosure.

The invention claimed is:

1. A display device, comprising a display panel, an anti-blue-light layer and a backlight module, wherein the anti-blue-light layer is positioned between the display panel and the backlight module, and the anti-blue-light layer is capable of reflecting high-energy shortwave blue light incident from a direction of the backlight module and light incident from a direction of the display panel, wherein
   a micro lens array of a concave-convex structure is arranged on a surface of a side of the anti-blue-light layer facing to the display panel,
   the display device further comprises a light diffusion layer, and the anti-blue-light layer is positioned between the light diffusion layer and the backlight module.

2. The display device according to claim 1, wherein, the anti-blue-light layer reflects blue light with a wavelength between 435 nm and 440 nm.

3. The display device according to claim 1, wherein, a first polarizer is arranged on a side of the display panel away from the backlight module, and a second polarizer is arranged on a side of the display panel facing to the backlight module,
wherein, the anti-blue-light layer is positioned between the second polarizer and the backlight module.

4. The display device according to claim 3, wherein, the anti-blue-light layer is adhered to a surface of a side of the second polarizer facing to the backlight module.

5. The display device according to claim 1, wherein, a first polarizer is arranged at a side of the display panel away from the backlight module, and a second polarizer is arranged at a side of the display panel facing to the backlight module,
wherein, the anti-blue-light layer is positioned between the second polarizer and the display panel.

6. The display device according to claim 5, wherein, the anti-blue-light layer is adhered to a surface of a side of the second polarizer facing to the display panel.

7. The display device according to claim 3, wherein, the light diffusion layer is further arranged on a side of the second polarizer facing to the backlight module.

8. The display device according to claim 7, wherein, the anti-blue-light layer is adhered to a surface of a side of the light diffusion layer facing to the backlight module.

9. The display device according to claim 1, wherein, the anti-blue-light layer has a multilayer structure formed by at least two materials with different refractive indexes in an overlapping manner.

10. The display device according to claim 1, wherein, a thickness of the anti-blue-light layer is 10~200 μm.

11. A display device, comprising a display panel, an anti-blue-light layer and a backlight module, wherein the anti-blue-light layer is positioned between the display panel and the backlight module, and the anti-blue-light layer is capable of reflecting high-energy shortwave blue light incident from a direction of the backlight module and light incident from a direction of the display panel, wherein
a micro lens array of a concave-convex structure is arranged on a surface of a side of the anti-blue-light layer facing to the display panel,
the display device further comprises a light diffusion layer, and the light diffusion layer and the anti-blue-light layer form a composite layer.

* * * * *